US009679205B2

(12) United States Patent
Chen et al.

(10) Patent No.: US 9,679,205 B2
(45) Date of Patent: Jun. 13, 2017

(54) METHOD AND SYSTEM FOR DISPLAYING STEREO IMAGE BY CASCADE STRUCTURE AND ANALYZING TARGET IN IMAGE

(71) Applicants: Chao Chen, Beijing (CN); Yaojie Lu, Beijing (CN); Zhongchao Shi, Beijing (CN); Dianchao Liu, Beijing (CN)

(72) Inventors: Chao Chen, Beijing (CN); Yaojie Lu, Beijing (CN); Zhongchao Shi, Beijing (CN); Dianchao Liu, Beijing (CN)

(73) Assignee: RICOH COMPANY, LTD., Tokyo (JP)

( * ) Notice: Subject to any disclaimer, the term of this patent is extended or adjusted under 35 U.S.C. 154(b) by 91 days.

(21) Appl. No.: 14/731,577

(22) Filed: Jun. 5, 2015

(65) Prior Publication Data
US 2015/0363633 A1 Dec. 17, 2015

(30) Foreign Application Priority Data
Jun. 13, 2014 (CN) .......................... 2014 1 0264246

(51) Int. Cl.
G06K 9/00 (2006.01)
G06T 7/00 (2017.01)

(52) U.S. Cl.
CPC ..... *G06K 9/00805* (2013.01); *G06K 2209/21* (2013.01)

(58) Field of Classification Search
None
See application file for complete search history.

(56) References Cited

U.S. PATENT DOCUMENTS

| 8,254,643 | B2 | 8/2012 | Shi et al. |
| 8,363,909 | B2 | 1/2013 | Guan et al. |
| 8,660,317 | B2 | 2/2014 | Li et al. |
| 2003/0165268 | A1* | 9/2003 | Franz .................. G06T 7/00 382/181 |

(Continued)

FOREIGN PATENT DOCUMENTS

CN 103390164 A 11/2013

OTHER PUBLICATIONS

Viola et al., "Robust Real-Time Face Detection", International Journal of Computer Vision 57(2), p. 137-154, 2004.*

(Continued)

*Primary Examiner* — Jason Heidemann
*Assistant Examiner* — Brian Shin
(74) *Attorney, Agent, or Firm* — Harness, Dickey & Pierce, PLC

(57) ABSTRACT

A method and a system for analyzing a target in a stereo image by displaying the stereo image using a cascade structure are disclosed. The method includes for the input stereo image, generating, based on a first relevant feature, rule or model of the stereo image, at least a first first-level structure map, each of the first first-level structure maps being generated based on an individual tolerance level of the first relevant feature, rule or model, and each of the first first-level structure maps including the target at an individual first division level; and at least partly integrating the first first-level structure maps and analyzing the target in the stereo image, to obtain a structure map of a first-level target analysis result including the target.

18 Claims, 11 Drawing Sheets

(56) References Cited

U.S. PATENT DOCUMENTS

2008/0215184 A1* 9/2008 Choi ................... G06K 9/3241
                                                      700/259
2008/0253664 A1* 10/2008 Li ..................... G06K 9/00228
                                                      382/226

OTHER PUBLICATIONS

Chinese Office Action and English translation thereof dated Oct. 14, 2016.

* cited by examiner

LOW LEVEL CSP CONSTRUCTION (a) ORIGINAL
GRAYSCALE IMAGE (b) ORIGINAL
DISPARITY MAP (a) BOTTOM LAYER STRUCTURE MAP IN LOW CSP (b) INTERMEDIATE LAYER STRUCTURE MAP IN LOW CSP (c) TOP LAYER STRUCTURE MAP IN LOW CSP

STRUCTURE MAPS OF DIFFERENT LAYERS
IN CSP BASED ON SPACE ADJACENCY FEATURE

LOW LEVEL CASCADE
STRUCTURE (LLCS)
PYRAMID A (a)

(b)　　　　　　　　　　　　(c)

(a)          (b)

EXAMPLE OF LOW CSP FUSION (a) STRUCTURE MAPS OF SPACE ADJACENCY FEATURE (b) STRUCTURE MAPS OF GRAYSCALE CONFORMITY FEATURE (c) STRUCTURE MAPS OF HORIZONTAL GRAYSCALE CONFORMITY (a) BOTTOM LAYER STRUCTURE MAP
IN HIGH CSP (b) INTERMEDIATE LAYER STRUCTURE MAP
IN HIGH CSP (c) TOP LAYER STRUCTURE MAP
IN HIGH CSP

HIGH LEVEL PYRAMID

METHOD AND SYSTEM FOR DISPLAYING STEREO IMAGE BY CASCADE STRUCTURE AND ANALYZING TARGET IN IMAGE

BACKGROUND OF THE INVENTION

1. Field of the Invention

The present invention generally relates to image processing of stereo vision, and specifically, a method and a system for displaying a stereo image by a cascade structure and analyzing a target in the image.

2. Description of the Related Art

Currently, the analysis and processing technology of a three-dimensional image based on stereo vision has become a popular research topic. For example, it is very important for automatic drive of a vehicle to provide reliable understanding of a three-dimensional stereo road environment. The recognition of a three-dimensional stereo road environment may mainly include road surface estimation, vanishing point computation, target detection, etc. As the most important part, analysis and detection of a target directly affect automatic drive of a vehicle.

The method of analyzing and detecting a target based on single frame information of a stereo image mainly includes: (1) a method based on a sliding window or an improved method thereof, and (2) a method based on division/clustering. The first method is usually simple but the computation is huge. Compared to the first method, the second method has advantages in real-time performance, and has strong robustness against appearance change of the target. However, it is difficult for the second method to perform accurate clustering or division by a unified feature or a matched rule. If the clustering condition is too loose, over-merging due to mistakenly merging adjacent targets will be easily caused; and if the clustering condition is too strict, over-division due to mistakenly dividing a target into several small blocks may occur.

In view of the above problems, the present invention has an object to provide a new method for analyzing and detecting a target that can obtain a more accurate position of the target.

SUMMARY OF THE INVENTION

According to an aspect of the present invention, a method for analyzing a target in a stereo image by displaying the stereo image using a cascade structure includes: for the input stereo image, generating, based on a first relevant feature, rule or model of the stereo image, at least a first first-level structure map, each of the first first-level structure maps being generated based on an individual tolerance level of the first relevant feature, rule or model, and each of the first first-level structure maps including the target at an individual first division level; and at least partly integrating the first first-level structure maps and analyzing the target in the stereo image, to obtain a structure map of a first-level target analysis result including the target.

According to another aspect of the present invention, a system for analyzing a target in a stereo image by displaying the stereo image using a cascade structure includes: a first first-level generation apparatus configured to, for the input stereo image, generate, based on a first relevant feature, rule or model of the stereo image, at least a first first-level structure map, each of the first first-level structure maps being generated based on an individual tolerance level of the first relevant feature, rule or model, and each of the first first-level structure maps including the target at an individual first division level; and a first first-level analysis apparatus configured to at least partly integrate the first first-level structure maps and analyze the target in the stereo image, to obtain a structure map of a first-level target analysis result including the target.

DETAILED DESCRIPTION OF THE PREFERRED EMBODIMENTS

In the following, embodiments of the present invention are described in detail with reference to the accompanying drawings, so as to facilitate the understanding of the present invention. It should be understood that, the present invention is not limited to the embodiments, and the scope of the present invention may include various modifications, replacements or combinations. It should be noted that, the steps of the method described here may be implemented by any functional block or functional design, and the functional block or functional design may be implemented as a physical entity, a logical entity or a combination thereof.

In the following, embodiments of the present invention are described in detail with reference to the accompanying drawings, so as to facilitate the understanding of the present invention.

Figure 1:
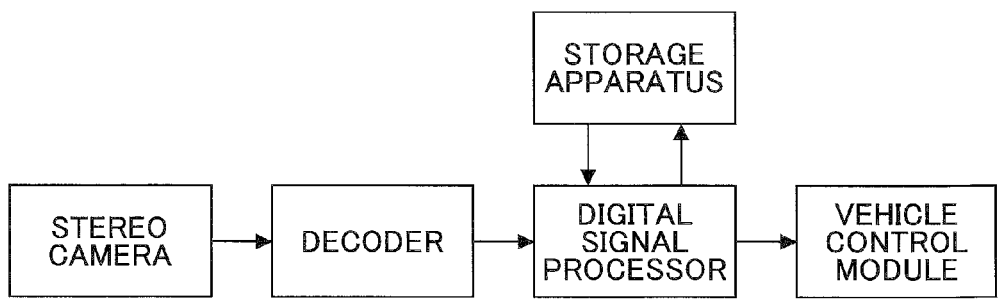
FIG. 1 is a schematic drawing illustrating a hardware structure of the technology that applies to the present invention.

FIG. 1 is a schematic drawing illustrating a hardware structure of the technology that applies the present invention.

As illustrated in FIG. 1, a stereo camera (such as a binocular camera) transfers a taken stereo image to a decoder. The decoder decodes the stereo image and converts the stereo image to any required images, such as disparity maps or grayscale images. A digital signal processor performs processing for a target image (such as a disparity map or a grayscale image) as an input image together with a storage device, and outputs a detected target and other relevant data to a vehicle control module. The vehicle control module performs control of a vehicle, such as recognition of a pedestrian, a vehicle or a road, and automatic drive based on the detected target and other relevant data. The digital signal processor may be connected to an input device (the binocular camera and the decoder), an output device (the vehicle control module) and the storage device. The method according to the present invention may be executed in the digital signal processor.

Figure 2:
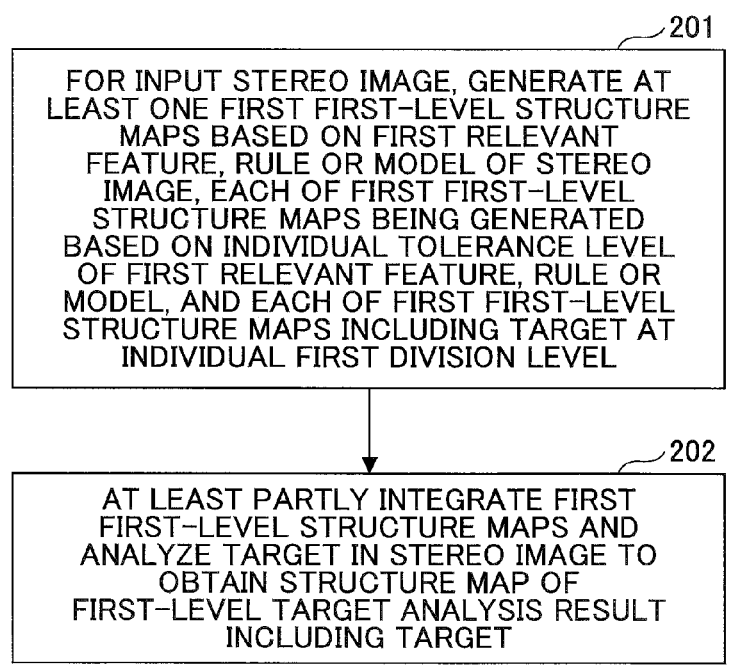
FIG. 2 is a flowchart illustrating a method for analyzing a target in a stereo image by displaying the stereo image using a cascade structure according to an embodiment of the present invention.

FIG. 2 is a flowchart illustrating a method for analyzing a target in a stereo image by displaying the stereo image using a cascade structure according to an embodiment of the present invention.

As illustrated in FIG. 2, a method for analyzing a target in a stereo image by displaying the stereo image using a cascade structure includes: step S201, for the input stereo image, generating, based on a first relevant feature, rule or model of the stereo image, at least a first first-level structure map, each of the first first-level structure maps being generated based on an individual tolerance level of the first relevant feature, rule or model, and each of the first first-level structure maps including the target at an individual first division level; and step S202, at least partly integrating the first first-level structure maps and analyzing the target in the stereo image, to obtain a structure map of a first-level target analysis result including the target.

It should be noted that, in order to generate at least a first first-level structure map based on the first relevant feature, rule or model, pre-processing for the input stereo image may be performed. For example, the stereo image may be converted to a disparity map or a grayscale image, or an edge detection map may be obtained by performing edge detection.

In an embodiment, the first or second relevant feature, rule or model may include a space adjacency feature, a grayscale conformity feature, an edge continuity feature, or a contour feature that are used for clustering. In an embodiment, the individual tolerance level of the first or second relevant feature, rule or model includes clustering based on an individual space disparity (or distance or depth) threshold using a fixed disparity center or a movable disparity center in a case of the space adjacency feature, includes clustering based on an individual grayscale difference threshold in a case of the grayscale consistency feature, includes clustering based on an individual edge continuity threshold in a case of the edge continuity feature, or includes clustering based on an individual contour inclusion relation in a case of the contour feature. If the detection target, such as a person or a vehicle stands upright, a disparity (or distance or depth) threshold (the threshold may be relatively small, because the target stands upright) may be set for a disparity (or distance or depth) parameter of the disparity map. Clustering is performed using a fixed disparity center or a movable disparity center based on the disparity (or distance or depth) threshold, and some pixels having a disparity value (or distance value or depth value) less than the disparity (or distance or depth) threshold are clustered to form division regions. These division regions may become an over-division case, an over-merging case or an appropriate size case depending on a magnitude of the disparity (or distance or depth) threshold. Additionally, a smaller or larger clustering division region may be formed depending on whether the clustering is performed using a fixed disparity center or a movable disparity center.

In this way, clustering structure maps including the target at individual division level are obtained by selecting an individual tolerance level of the first relevant feature, rule or model, and a series of clustering structure maps with a layering structure, which include the target to be detected, can be formed. It should be noted that, besides the clustering based on the space adjacency feature, another series of clustering structure maps with a layered structure may also be obtained based on an individual grayscale difference threshold in a case of the grayscale consistency feature or an individual edge continuity threshold in a case of the edge continuity feature, and the obtained clustering structure maps also include the target to be detected.

If the structure maps at an individual division level are sorted from top to bottom in the order of the division level from rough division to fine division, a cascade structure pyramid (CSP) structure can be constructed. Compared to a structure map at the bottom of the pyramid, information in a structure map at the top of the pyramid is usually less and more abstract. The reason why it is called "pyramid" is because the structure map at the top of the CSP is more abstract and has less data, and "smaller" than the structure map at the bottom of the CSP when the structure maps are shown based on density of the data; namely, the shape of the structure maps looks like a pyramid. It should be noted that, the construction method for the CSP may be selected, and the "pyramid" is just for explaining the concept of the present invention.

Because the first first-level structure maps are generated based on an individual tolerance level of the first relevant feature, rule or model, the first first-level structure maps may include the target at an individual division level. For example, some structure maps may include more over-divided targets (namely, an actual target is over-divided into small regions) and fewer over-merged targets (namely, a plurality of actual targets are over-merged into a large region); some structure maps may include fewer over-divided targets and more over-merged targets (namely, the division is not enough); or some structure maps may include division targets with an appropriate size that have the actual object, few over-divided targets and few over-merged targets. A mutual correction may be performed between the over-divided targets and the over-merged targets by analyzing the structure maps at individual division level, so that more accurate division targets can be obtained.

In an embodiment, mutual correction of the first first-level structure maps including the target at the individual first division level may be performed and it may be determined which of the targets obtained by dividing at the first division levels, respectively, is more accurate based on a feature of the target, to obtain the structure map of the first-level target analysis result that includes the target obtained by dividing at the determined first division level. For example, in a case where clustering is performed based on a space adjacency feature, different first first-level structure maps have division targets at individual division levels. If the object to be detected is a bus, features of the bus may include an average value of the height or the width of a typical bus, a feature that the differences of disparity values (or distance values or depth values) between pixels on the back surface of the bus are small (disparity values (or distance values or depth values) of pixels on the back surface of the bus in a disparity map are generally close, because the back surface of a bus typically stands upright and a front side of a binocular camera usually faces the back surface of a bus), a feature that the differences of disparity values (or distance values or depth values) between pixels on a vertical line on a side surface of the bus are small (similarly, because the side surface of the bus typically stands upright), and/or a feature that the differences of disparity values (or distance values or depth values) of pixels within a division target are small. In this way, a division target with a feature value close to a predetermined value or a predetermined difference value of disparity values (distance values or depth value), and/or a division target with a feature value on a vertical line direction close to a predetermined difference value of disparity values (or distance values or depth values) can be determined based on these features of a bus, so that the division target is determined as a target analysis result (namely, a position of the target to be detected). Alternatively, it may be determined that the division target may be further divided, if the difference between disparity value (or distance value or depth value) of a block and disparity value (or distance value or depth value) of another block within the division target is large.

In this way, mutual correction of division structure maps including the target at the individual division level obtained by the relevant feature, rule or model, such as a structure map with an over-divided region, a structure map with an over-merged region or a structure map with an appropriate size region, is performed; and it is determined which one of the targets obtained by dividing at the first division levels, respectively, is more accurate based on a feature of the target. Thus, a more accurate division target can be obtained.

It should be noted that, the term "object" represents an actual object to be actually detected, and the term "target", "division target (divided target)" or "division region (divided region)" represents a target detection result obtained by processing the stereo image. The target detection result may not be the actual position of the object, but may vary according to the above target detection method and/or changed accuracy of the target detection.

Figure 3:
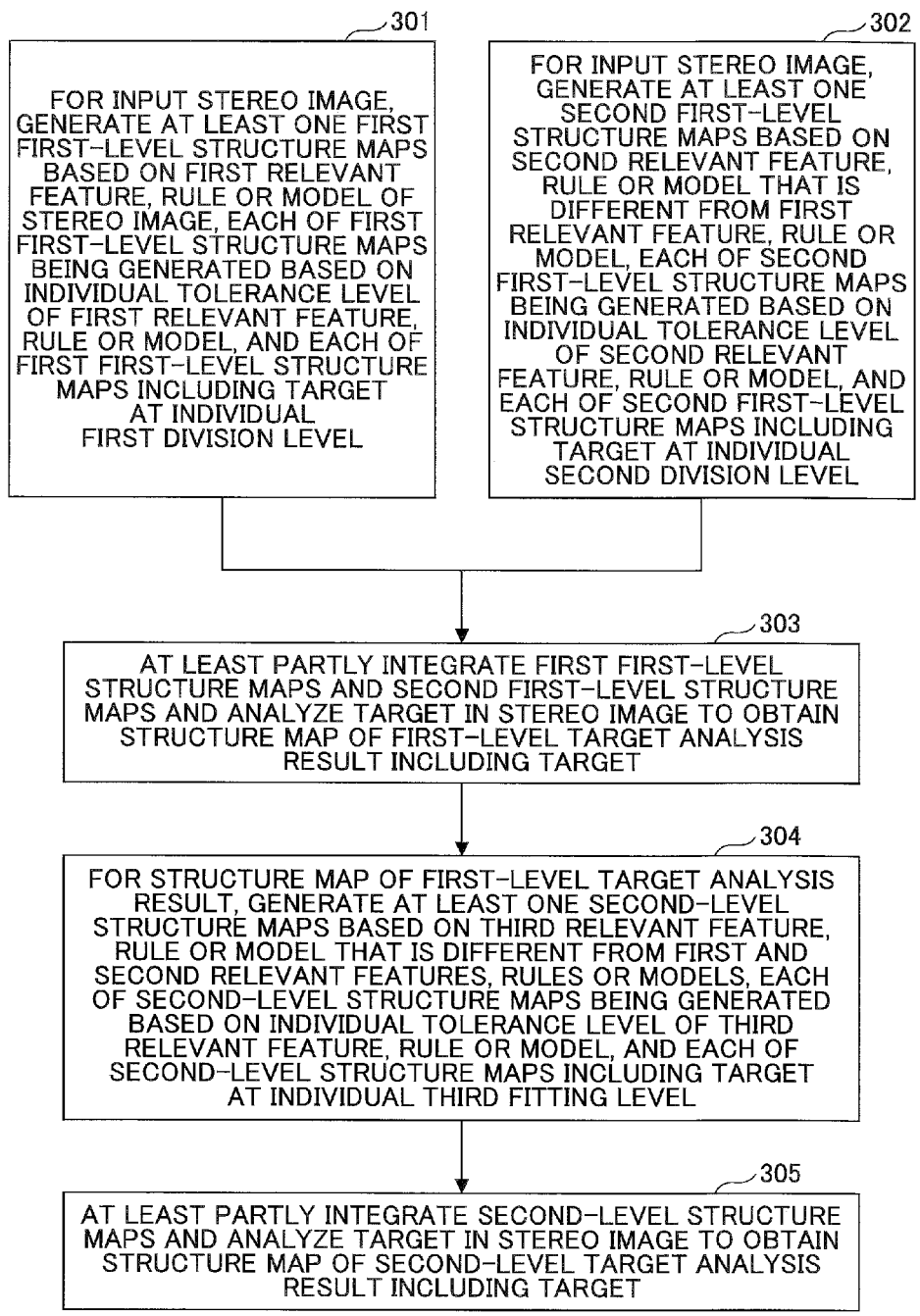
FIG. 3 is a flowchart illustrating a method for analyzing a target in a stereo image by displaying the stereo image using a cascade structure according to another embodiment of the present invention.

FIG. 3 is a flowchart illustrating a method for analyzing a target in a stereo image by displaying the stereo image using a cascade structure according to another embodiment of the present invention.

As illustrated in FIG. 3, the method includes: step 301, for the input stereo image, generating, based on a first relevant feature, rule or model of the stereo image, at least a first first-level structure map, each of the first first-level structure maps being generated based on an individual tolerance level of the first relevant feature, rule or model, and each of the first first-level structure maps including the target at an individual first division level; step 302, for the input stereo image, generating, based on a second relevant feature, rule or model that is different from the first relevant feature, rule or model, at least a second first-level structure map, each of the second first-level structure maps being generated based on an individual tolerance level of the second relevant feature, rule or model, and each of the second first-level structure maps including the target at an individual second division level; and step 303, at least partly integrating the first first-level structure maps and the second first-level structure maps and analyzing the target in the stereo image, to obtain a structure map of a first-level target analysis result including the target.

In this way, in step 301, clustering structure maps including the target at individual division level are obtained by selecting an individual tolerance level of the first relevant feature, rule or model, and a series of first first-level clustering structure maps with a layering structure can be formed. Meanwhile, in step 302, clustering structure maps including the target at individual division level are obtained by selecting an individual tolerance level of the second relevant feature, rule or model, and a series of second first-level clustering structure maps with a layering structure can be formed.

If the structure maps at an individual division level are sorted from top to bottom in the order of the division level from rough division to fine division, two cascade structure pyramid (CSP) structures, which include a first first-level CSP corresponding to the first relevant feature, rule or model and a second first-level CSP corresponding to the second relevant feature, rule or model. It should be noted that, both of these two CSPs are the first-level.

The first first-level structure maps may include the target at an individual division level of the first standard (such as relevant feature, rule or model). For example, some structure maps may include more over-divided targets (namely, an actual target is over-divided into small regions) and fewer over-merged targets (namely, a plurality of actual targets are over-merged into a large region); some structure maps may include fewer over-divided targets and more over-merged targets (namely, the division is not enough); or some structure maps may include division targets with an appropriate size that have the actual object, few over-divided targets and few over-merged targets. Similarly, the second first-level structure maps may include the target at an individual division level of the second standard that is different from the first standard. For example, some structure maps may include more over-divided targets (namely, an actual target is over-divided into small regions) and fewer over-merged targets (namely, a plurality of actual targets are over-merged into a large region); some structure maps may include fewer over-divided targets and more over-merged targets (namely, the division is not enough); or some structure maps may include division targets with an appropriate size that have the actual object, few over-divided targets and few over-merged targets. Mutual correction may be performed between the over-divided targets and the over-merged targets by analyzing the structure maps at individual division level, so that more accurate division targets can be obtained.

In an embodiment, the first first-level structure maps may be corrected based on the second first-level structure maps and it may be determined which one of the targets obtained by dividing at the first and second division levels, respectively, is more accurate based on a feature of the target, to obtain the structure map of the first-level target analysis result that includes the target obtained by dividing at the determined division level. For example, the first standard clustering is performed based on a space adjacency feature, and the second standard clustering is performed based on a grayscale conformity feature. If the object to be detected is a bus, features of the bus may include an average value of the height or the width of a typical bus, a feature that the differences of disparity values (or distance values or depth values) between pixels on the back surface of the bus are small, a feature that the differences of disparity values (or distance values or depth values) between pixels on a vertical line on a side surface of the bus are small, and/or a feature that grayscale values on a horizontal direction on the back surface of the bus are almost the same. In this way, a division target with a feature value close to a predetermined value or a predetermined difference value of disparity values (distance values or depth values), a division target with a feature value on a vertical line direction close to a predetermined difference value of disparity values (or distance values or depth values), and/or a division target with grayscale values on a horizontal direction on the back surface that are almost the same can be determined as a more accurate division target. Alternatively, a merging or division may be performed for the divided targets in the first-level or second-level structure maps to obtain the division target at the determined division level, so that the division target is determined as the target analysis result (the position of the target to be detected).

In this way, mutual correction of division structure maps including the target at the individual division level obtained by these two relevant features, rules or models, such as a structure map with an over-divided region, a structure map with an over-merged region or a structure map with an appropriate size region, is performed; and it is determined which one of the targets obtained by dividing at the first or second division levels, respectively, is more accurate based on a feature of the target. Thus, a more accurate division target can be obtained.

In an embodiment, the feature of the target may include symmetry of the target, horizontal grayscale conformity of the target, or an inclusion characteristic of the inner contour of the target. It should be noted that, the feature of the target is not limited to these features, and may also include features of shape that are related to the target, such as a "Ω" shape of a head and shoulders of a person.

As described above, in the method, an accurate analysis result of the division target can be obtained without performing steps 304 and 305 illustrated in FIG. 3. It should be noted that, the above analysis is still a target analysis of the first-level pyramid, and only another first pyramid is added for supporting the target analysis of a first-level pyramid, compared to the embodiment of FIG. 2.

In order to obtain a more accurate result of the division target, the method may further include: step 304, for the structure map of the first-level target analysis result, generating, based on a third relevant feature, rule or model that is different from the first and second relevant features, rules or models, at least a second-level structure map, each of the second-level structure maps being generated based on an individual tolerance level of the third relevant feature, rule or model, and each of the second-level structure maps including the target at an individual third fitting level; and step 305, at least partly integrating the second-level structure maps and analyzing the target in the stereo image, to obtain a structure map of a second-level target analysis result including the target.

In this way, a series of second-level structure maps corresponding to the third relevant feature, rule or model are constructed based on the structure maps of the first-level target analysis result, and a second-level pyramid is optionally formed; accordingly, mutual correction of the structure maps of the second-level pyramid including an over-divided region, an over-merged region or an appropriate size region is performed; and it is determined which one of the targets obtained by dividing at the first division levels, respectively, is more accurate based on a feature of the target. Thus, a more accurate division target can be obtained. The second-level pyramid is constructed based on structure maps of the relatively accurate first-level target analysis result, thus the structure maps of the division target obtained by performing analysis and correction of the second-level pyramid are more accurate.

In an embodiment, the third relevant feature, rule or model may include a vertical line fitting model, a plane fitting model or a cube fitting model. Specifically, for example, in a case of the vertical line fitting model, blocks constructed by the first-level division target are fitted to one or more vertical lines, and on each of the vertical lines, blocks constructed by the division targets in the structure map have similar disparity values (distance values or depth values); in a case of the plane fitting model, blocks constructed by the first-level division target are fitted to one or more planes; and in a case of the cube fitting model, blocks constructed by the first-level division target are fitted to one or more cubes.

In an embodiment, mutual correction of the second-level structure maps including the target at the individual third fitting level may be performed and it may be determined which one of the targets obtained by dividing at the third fitting levels, respectively, is more accurate based on a feature of the target, to obtain the structure map of the second-level target analysis result that includes the target obtained by dividing at the determined third fitting level. For example, if the object to be detected is a bus, features of the bus may include a feature that the differences of disparity values (or distance values or depth values) between division blocks on a vertical line on the back surface of the bus are small, a feature that the back surface and the side surface of the bus are two surfaces, and/or the whole bus is a cube. In this way, a division target with a feature that the differences of disparity values (or distance values or depth values) between division blocks on a vertical line on the back surface of the bus are small, a feature that the back surface and the side surface of the bus are two surfaces, and/or the whole bus is a cube can be determined as an accurate division target. Alternatively, a merging or division may be performed for the divided targets in the first-level structure maps or a further fitting may be performed, to obtain the division target at the determined division level, so that the division target is determined as the target analysis result (the position of the target to be detected).

In this way, in a two-level pyramid structure, a further target analysis can be performed based on a preliminary target analysis result of the first-level pyramid structure, thus a more accurate result of the target analysis can be obtained.

It should be noted that, the present embodiment is not limited to two first-level CSP structures and one second-level CSP structure described above, and there may be two or more first-level CSP structures, one or more second-level CSP structures, and one or more third-level, fourth-level, and n-level (n is a positive integer) CSP structures. Specifically, mutual correction of at least one first-level CSP structure is performed to obtain a structure map of the first-level target analysis result, at least one second-level CSP structure map is constructed based on the first-level target analysis result, mutual correction of at least one second-level CSP structure is performed to obtain a structure map of the second-level target analysis result, at least one third-level CSP structure map is constructed based on the second-level target analysis result, mutual correction of at least one third-level CSP structure is performed to obtain a structure map of the third-level target analysis result, and so on.

Next, an actual example of the present embodiment will be described in detail.

Figure 4A:
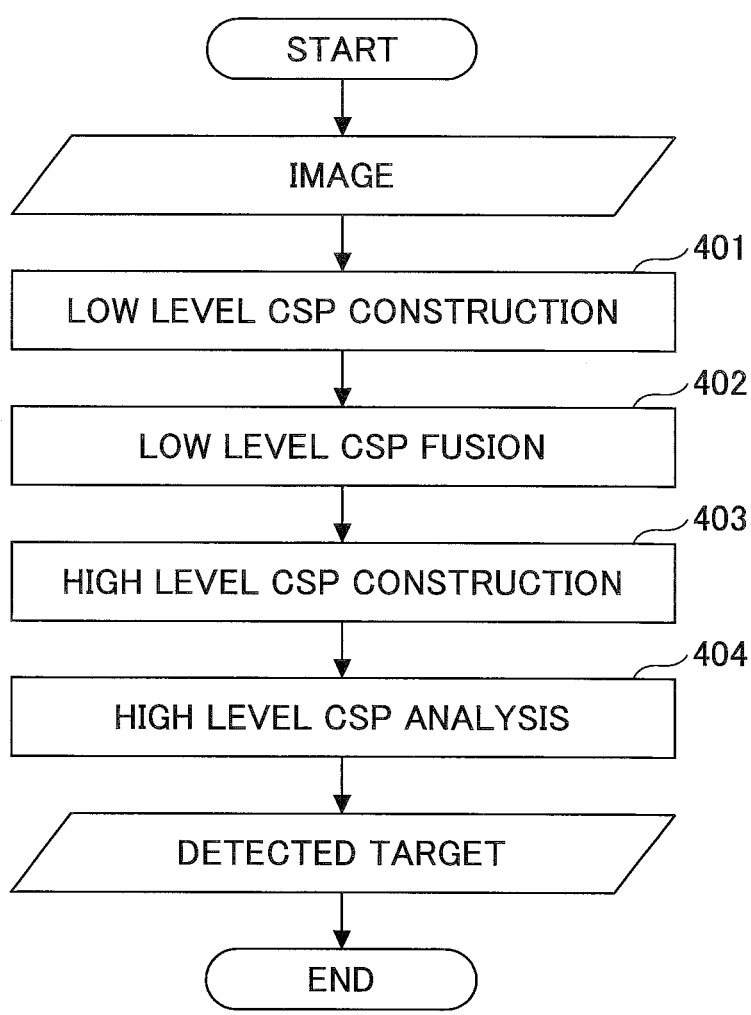
FIG. 4A is a flowchart illustrating a method for analyzing a target in a stereo image by displaying the stereo image using a cascade structure according to another embodiment of the present invention.
Figure 4B:
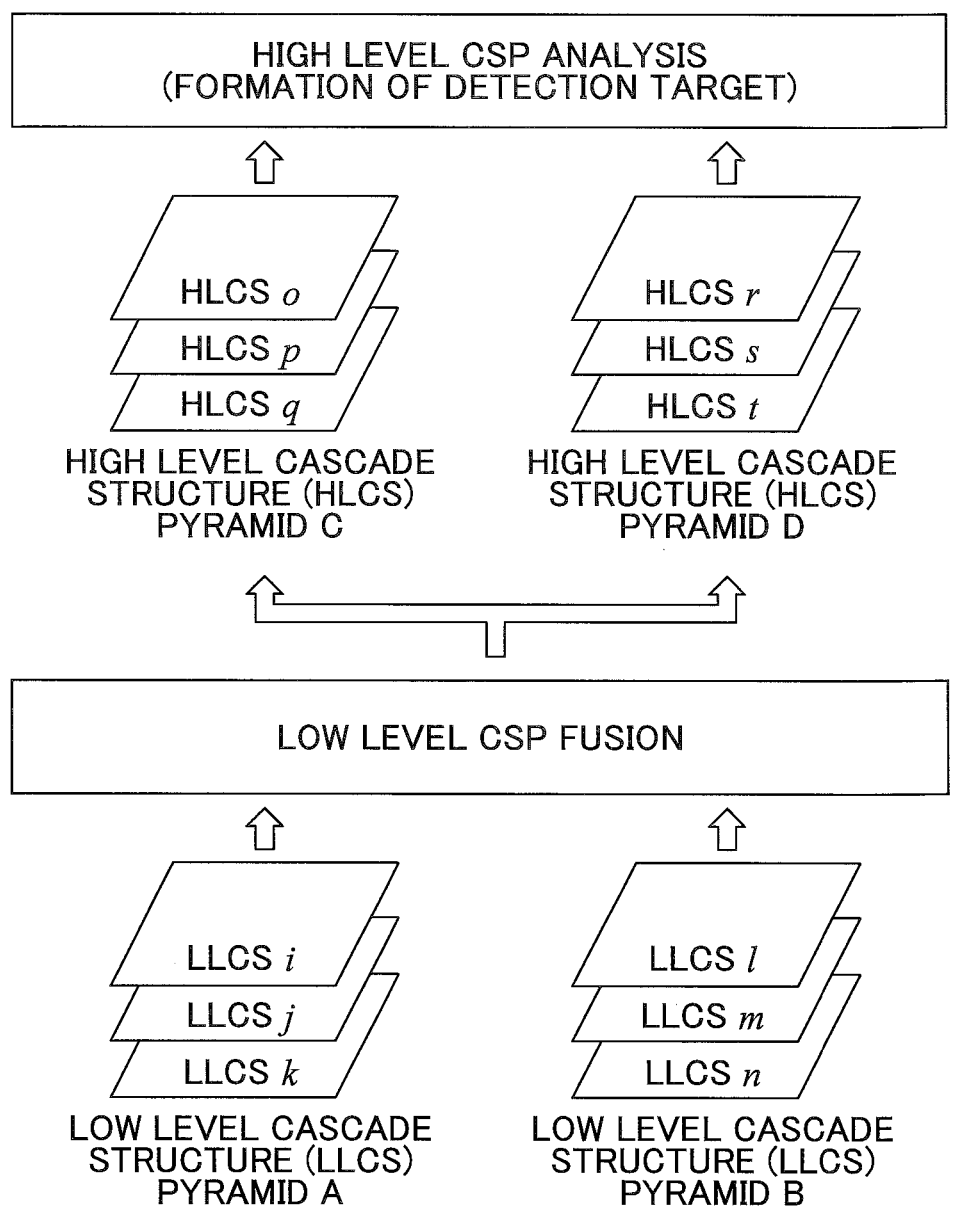
FIG. 4B is a schematic drawing illustrating a process of the method illustrated in FIG. 4A.

FIG. 4A is a flowchart illustrating a method for analyzing a target in a stereo image by displaying the stereo image using a cascade structure according to another embodiment of the present invention, and FIG. 4B is schematic drawing illustrating a process of the method illustrated in FIG. 4A.

The method illustrated in FIG. 4A includes: step 401, constructing a low level CSP for the input stereo image; step 402, performing correction and fusion for the low level CSP; step 403, constructing a high level CSP based on the low level CSP, and performing analysis and correction the high level CSP to obtain position information of the detected target.

As illustrated in FIG. 4B, in the embodiment, there are low level and high level CSPs, and each of the CSPs includes three structure maps. For example, as illustrated in FIG. 4B, the low level CSP includes pyramids A and B, the high level CSP includes pyramids C and D. The low level pyramid A includes three low level cascade structure (LLCS) maps i, j and k, the low level pyramid B includes three low level cascade structure (LLCS) maps l, m and n, the high level pyramid C includes three high level cascade structure (HLCS) maps o, p and q, and the high level pyramid D includes three high level cascade structure (HLCS) maps r, s and t.

It should be noted that, for convenience of understanding, the term "level" refers to a large structure consisting of a plurality of pyramids (such as the upper and lower two level structure as illustrated in FIG. 4B), and the term "layer" refers to a structure map in a pyramid (such as the three-layer structure in the pyramids as described in FIG. 4B).

Figure 5:
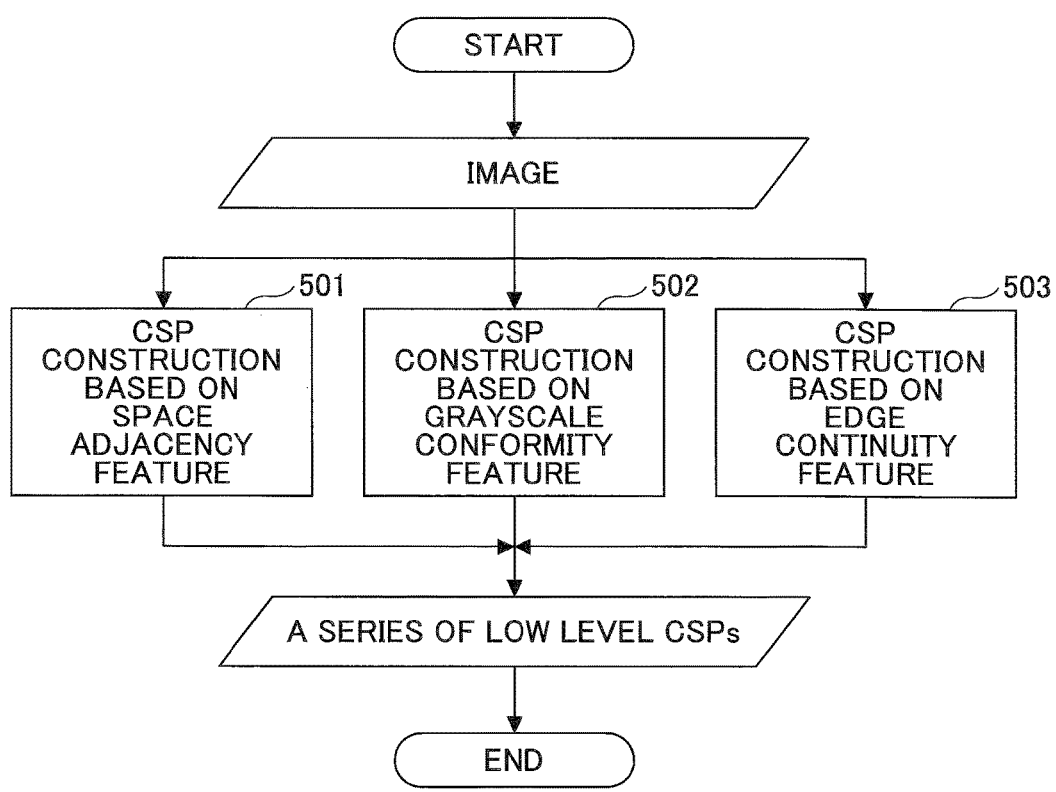
FIG. 5 is a flowchart illustrating a process of generating structure maps of a series of low level cascade structure pyramids (CSP) based on different relevant features, rules or models as illustrated in FIG. 4A.

FIG. 5 is a flowchart illustrating a process of generating structure maps of plural series of low level cascade structure pyramids (CSP) based on different relevant features, rules or models as illustrated in FIG. 4A.

As illustrated in FIG. 5, a flow of low level CSP construction includes: step 501, constructing a CSP based on a space adjacency feature; step 502, constructing a CSP based on a grayscale conformity feature; and step 503, constructing a CSP based on an edge continuity feature. The CSP construction is not limited to the above features and the CSP may also be constructed based on other relevant features, rules or models. In the text, as an example, a CSP construction based on a space adjacency feature is described, and the CSP may also be constructed using other clustering methods based on other features.

FIGS. 6A to 6E are schematic drawings illustrating a process of generating structure maps of a series of low level cascade structure pyramids (CSP) based on a relevant feature, rule or model (in this example, a space adjacency feature) and obtaining a structure map of a low level target analysis result including the target by integrating the series of low level structure maps.

Figure 6A:
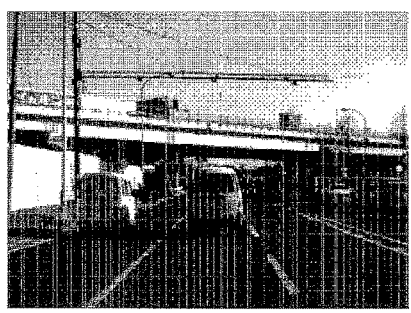
FIGS. 6A to 6E are schematic drawings illustrating a process of generating structure maps of a series of low level cascade structure pyramids (CSP) based on a relevant feature, rule or model and obtaining a structure map of a low level target analysis result including the target by integrating the series of low level structure maps.
Figure 6A:
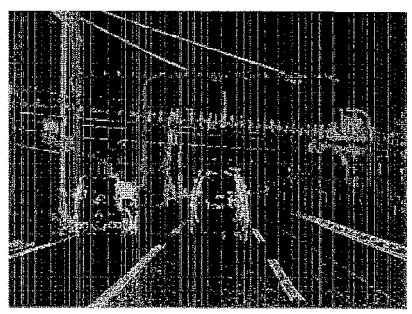

FIG. 6A illustrates an original grayscale map (as illustrated in (a) of FIG. 6A) and an original disparity map (as illustrated in (b) of FIG. 6A) obtained by converting the input stereo image.

Figure 6B:
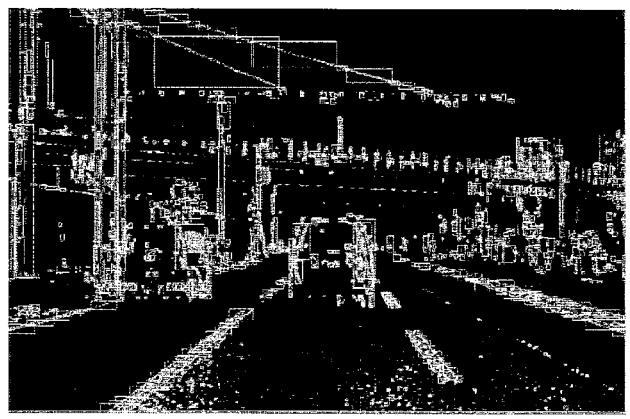
Figure 6B:
Figure 6B:
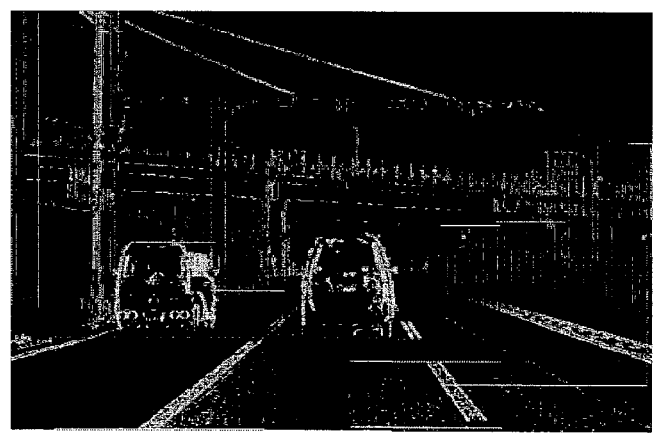

In step 402 of FIG. 4A, construction of a low level CSP may be performed based on a space adjacency feature, namely, processing for the input disparity map is performed to obtain the following series of structure maps (as illustrated in FIG. 6B).

(1) Clustering Map Based on Fixed Disparity Center

In this structure map, each of division regions has a fixed disparity center (when the division region is formed, a disparity value of a pixel that first joined the division region is set as the disparity center of the division region), a newly joined pixel has a disparity value close to that of the disparity center of the division region (at an actual disparity value (or a distance value or a depth value)) and is adjacent to the position of the division region. As illustrated in (a) of FIG. 6B, the white frame represents a block of clustering, and each of the blocks is a division region with information such as disparity, position and size. This structure map is located at a bottom layer of the CSP, and the structure map obtained by the above method has small and relatively specific division regions, and a large amount of information and data.

(2) Clustering Map Based on Movable Disparity Center

In this structure map, each of division regions has a movable disparity center. When the division region is formed, a disparity value of a pixel that first joined the division region is set as the disparity center of the division region. A newly joined pixel has a disparity value close to that of an adjacent boundary pixel in the division region; and the disparity center shifts to the disparity value of the newly joined pixel because the disparity center is calculated based the disparity values of existing pixels and newly joined pixel in the division region. Thus, each of the newly joined pixels may affect the disparity center of the division region. As illustrated in (b) of FIG. 6B, this structure map is located at an intermediate layer of the CSP, and the structure map has larger and relatively abstract division regions and a lesser amount of information and data than the bottom layer in (a) of FIG. 6B.

(3) Clustering Map Based on Large Adjacent Region

In this structure map, similar to the rule of the clustering map based on the movable disparity center, a threshold parameter of disparity difference is larger and/or the size of an adjacency region is larger, the clustering is performed in a larger range of the adjacency region, so that larger division regions are obtained. As illustrated in (c) of FIG. 6B, this structure map is located at a top layer of the CSP, and the structure map has larger and relatively abstract division regions, and a lesser amount of information and data than the intermediate layer in (b) of FIG. 6B.

Figure 6C:
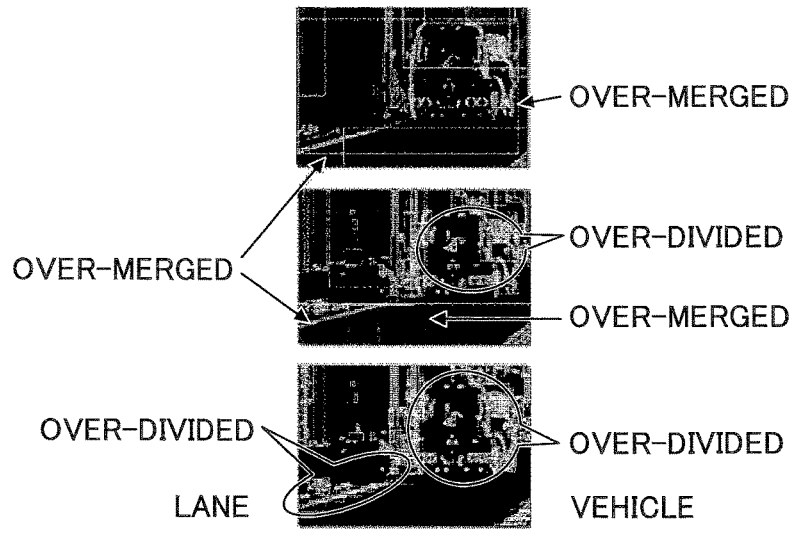

That is to say, in the above the three cases of different division levels based on the space adjacent feature, the structure maps of the target with three different division levels can be obtained. As illustrated in FIG. 6C, the bottom layer structure map may include many over-divided targets (namely, an actual target may be divided into too many small regions) and few over-merged targets (namely, a plurality of actual targets may be merged into a large region), the top layer structure map may include a few over-divided targets and many over-merged targets (namely, the division is not enough), and the intermediate layer structure maps may include division targets with an appropriate size that have the actual object, few over-divided targets and few over-merged targets.

It should be noted that, three-layer structure maps is just an example, and actually two-layer structure maps or structure maps with layers more than three may also be constructed.

Figure 6D:
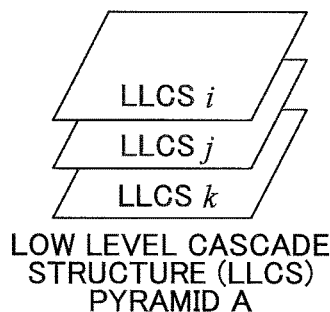
Figure 6D:

Preferably, as illustrated in (a) and (b) of FIG. 6D, CSPs based on the space adjacency feature may be constructed by the above structure maps in the order from low to high. These structure maps may be obtained by a common clustering method in the art, such as algorithm of Connected Component Labeling, algorithm of Region Growing or the like. Regarding the algorithm of Connected Component Labeling, the content of http://en.wikipedia.org/wiki/Connected-component_labeling can be used as a reference. The detailed description of a common clustering method in the art is omitted here.

The constructed CSP may be used for many applications. For example, mutual correction of over-divided and over-merged division targets may be performed by analyzing the structure maps at different division levels (as illustrated in (b) of FIG. 6D), thus more accurate division targets can be obtained (as illustrated in (c) of FIG. 6D).

In the following, in examples of lane detection and vehicle detection, how to perform mutual correction will be described, respectively.

FIG. 6C and (b) of FIG. 6D illustrate structure maps of different layers obtained at different division levels based the space adjacency feature. In the bottom layer structure map of the CSP (a clustering map based on a fixed disparity center), both a vehicle and a lane are over-divided. In the intermediate layer structure map of the CSP, a right part of the vehicle is over-divided and a left part of the vehicle is over-merged (it is merged together with the lane). In the top layer structure map of the CSP (a clustering map based on large adjacent region), both of the vehicle and the lane are over-merged.

Appropriate feature parameters (such as setting of a clustering center) and clustering parameters (such as threshold value) may be selected according to different applications, to control degree of over-division and over-merging of structure maps of each of the layers in the CSP. In subsequent steps, overall consideration and processing for these structure maps in the CSP may be performed to obtain a more accurate target position.

Figure 6E:
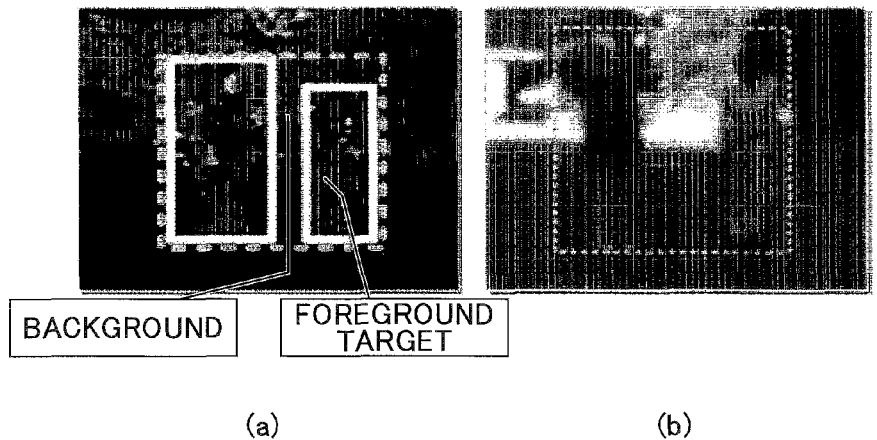

As an example of the consideration, as illustrated in FIG. 6E, the white bold frame represents two clustering blocks in the bottom layer structure map obtained based on the space adjacency feature, the white bold dotted frame represents a clustering block in the top layer structure map obtained based on the space adjacency feature, and it may not be known which clustering block is over-merged or over-divided. However, by performing disparity analysis for each of the targets in a screen, if there is a region, whose disparity value (or distance value or depth value) is different from two clustering blocks in a bottom layer structure map, between those two clustering blocks, it is considered that the two clustering blocks may be divided since a distant background (or another target) exists therebetween. Accordingly, it may be determined that the clustering block illustrated by the white bold dotted frame is over-merged; thus the over-merged clustering block in the top layer structure map is divided at the boundary of two foreground targets and the background, and the two foreground targets in the bottom layer structure map may be retained without performing further processing such as merging or division.

In this way, further processing such as merging, division or a retaining operation for these structure maps in the CSP may be performed according to specific features of targets in the image to obtain an accurate target position. It should be noted that, the method illustrated in FIG. 6E is just an example, and the condition of further merging, division or retaining is not limited to this example.

It should be noted that, in these examples of the structure maps in the CSP, a sparse displaying method is used. Actually, during internal processing of the system, a dense displaying method may be applied to the structure maps in the CSP. In a dense displaying method, a clustering result is displayed by a map structure including block information and the relationship between blocks. Accordingly, in the CSP, the top layer structure map is more abstract, has less data and looks "smaller", and the CSP has a pyramid-shape.

In step 402 of FIG. 4, low level CSP fusion is performed.

In this step, as illustrated in FIG. 6D, if there is only one low level CSP based on the space adjacency feature, further merging, division of the division regions (namely, the clustering result) may be performed by integrating only three layer structure maps in the low level CSP based on the space adjacency feature to correct the division target of the structure maps.

In this step, if where are more than one low level CSP, further merging or division may be performed by integrating structure maps of different layers in different low level CSPs to correct the division target of the structure maps on demand of different applications.

Figure 7A:
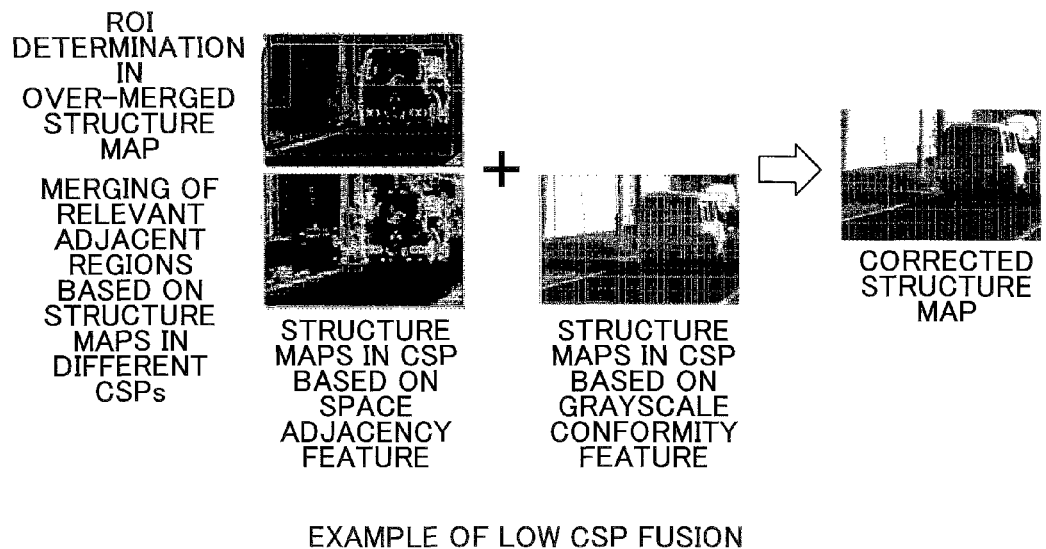
FIG. 7A is a schematic drawing illustrating a process of obtaining another structure map of a low level target analysis result including the target by integrating a series of low level structure maps based on a space adjacency feature and a series of low level structure maps based on a grayscale conformity feature.

In the following, as illustrated in FIG. 7A, an example of fusion correction of a low level CSP based on the space adjacency feature and a low level CSP based on the grayscale conformity feature (namely, two low level CSP) will be described. FIG. 7A is a schematic drawing illustrating a process of obtaining another structure map of a low level target analysis result including the target by integrating a series of low level structure maps based on a space adjacency feature and a series of low level structure maps based on a grayscale conformity feature.

Region of interest (ROI) to be processed in the fusion correction operation may be determined in high layer structure maps (over-merged clustering maps) in the CSP based on the space adjacency feature, as illustrated by the square frame in the upper left image of FIG. 7A. The low level structure map of CSP based on the space adjacency feature (the lower left image of FIG. 7A) and the low level structure map of CSP based on the grayscale conformity feature (the middle bottom image of FIG. 7A) are integrated, small clustering blocks in the low level structure map of CSP based on the space adjacency feature are set as basic data elements, and small clustering blocks in the low level structure map of the CSP based on the space adjacency feature and small clustering blocks in the low level structure map of the CSP based on the grayscale conformity feature have similar disparity values or similar grayscale values, respectively. In the ROI determined before, the small clustering blocks in these structure maps are input as basic data elements, and it determined which division level is correct based on feature of the vehicle to be detected; accordingly, further division and merging processing is performed to obtain the corrected structure maps, as illustrated in the right image of FIG. 7A.

Figure 7B:
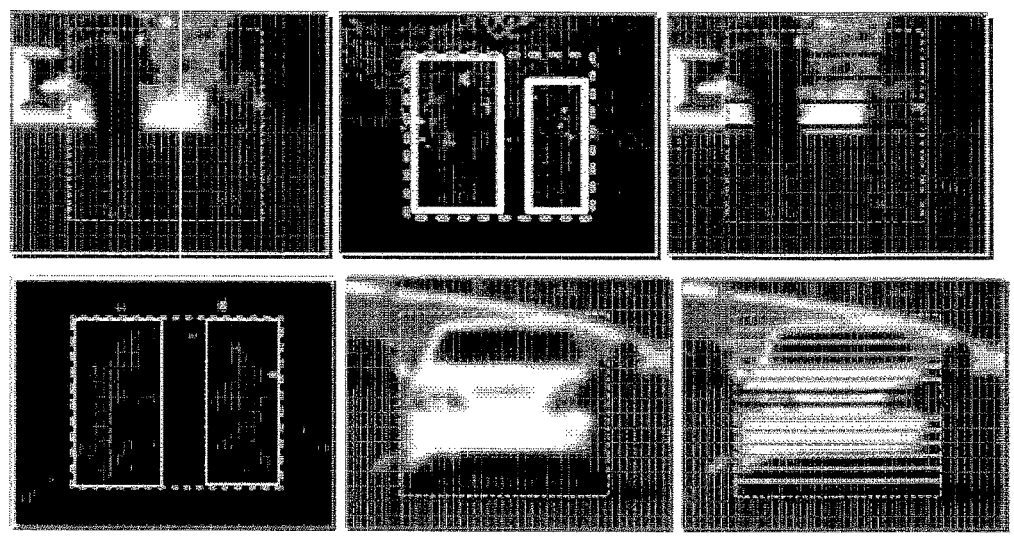
FIG. 7B is a schematic drawing illustrating images relating to a process of obtaining another structure map of a low level target analysis result including the target by integrating a series of low level structure maps based on a space adjacency feature and a series of low level structure maps based on a grayscale conformity feature.

Specifically, a possible method is illustrated in FIG. 7B. FIG. 7B is a schematic drawing illustrating images relating to a process of obtaining another structure map of a low level target analysis result including the target by integrating a series of low level structure maps based on a space adjacency feature and a series of low level structure maps based on a grayscale conformity feature.

The white frame in (a) of FIG. 7B represents clustering blocks of a bottom layer structure map obtained based on the space adjacency feature, and the white dotted frame represents ROI determined according to a top layer structure map obtained based on the space adjacency feature. The (b) of FIG. 7B represents the structure map obtained based on the grayscale conformity feature. The horizontal black lines at the top and bottom of (c) of FIG. 7B represent that verification of horizontal grayscale conformity fails and two blocks of the white frame in (a) of FIG. 7B cannot be merged into one block; and the horizontal gray line represents that verification of horizontal grayscale conformity is made and two blocks of the white frame in (a) of FIG. 7B can be merged into one block.

In this way, further processing such as merging, division or retaining operations for these two series of structure maps in the CSP (one or more structure maps of the space adjacency feature and one or more structure maps based on the grayscale conformity feature) may be performed according to specific features of targets in the image to obtain an accurate target position. It should be noted that, the method illustrated in FIG. 7B is just an example, and the condition of further merging, division or retaining is not limited to this example.

In step 403 of FIG. 4, high level CSP construction is performed.

In this step, the uncorrected low level CSP (as illustrated in FIG. 6B) or the corrected low level CSP (as illustrated in the right image of FIG. 7A) is set as the input, and high level CSP construction is performed based on high level relevant feature, rule or model. Here, an example of the corrected low level CSP and the high level CSP based on a geometric model will be described.

Figure 8A:
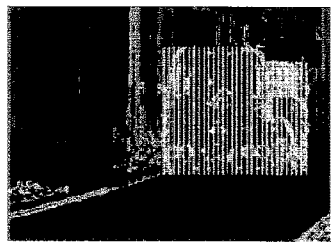
FIG. 8A is a schematic drawing illustrating a series of high level structure maps generated based on another structure map of a low level target analysis result including the target illustrated in FIG. 7A.
Figure 8A:
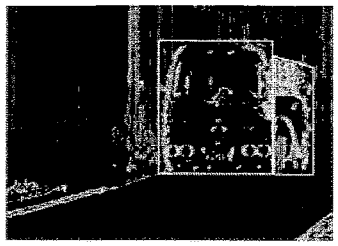
Figure 8A:
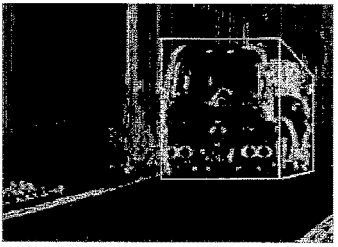
Figure 8B:
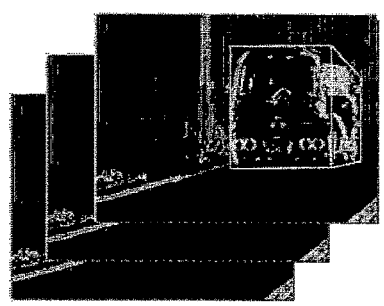
FIG. 8B is a schematic drawing illustrating structure maps of a series of high level cascade structure pyramids (CSP) obtained based on the series of high level structure maps illustrated in FIG. 8A.

FIG. 8A is a schematic drawing illustrating a series of high level structure maps generated based on another structure map of a low level target analysis result including the target illustrated in FIG. 7A. FIG. 8B is a schematic drawing illustrating structure maps of a series of high level cascade structure pyramids (CSP) obtained based on the series of high level structure maps illustrated in FIG. 8A.

The CSP of the geometric structure model illustrated in FIG. 8A is generated based on the low level CSP. Specifically, the region of interest (ROI) to be processed may be determined in the high layer structure map of the low level CSP; in the ROI, data in the low layer structure map of the low level CSP is input as a basic element; and parameter fitting of a geometric model is performed. The constructed CSP based on the geometric structure model may include the following structure maps.

(c1) Structure Map Based on Vertical Line Fitting Model

As illustrated by the white vertical lines in (a) of FIG. 8A, blocks consisting of the low level division targets are fitted to one or more vertical lines. On each of the vertical lines, division blocks in the low layer structure map from the low level CSP have similar disparity values (namely, distance values or depth values).

(c2) Structure Map Based on Plane Fitting Model

As illustrated by the white planes in (b) of FIG. 8A, blocks consisting of the low level division targets are fitted to one or more planes. Here, there are two plane: a plane of the front surface of the vehicle and a plane of the side surface of the vehicle.

(c3) Structure Map Based on Cube Fitting Model

As illustrated by the white cube in (c) of FIG. 8A, blocks consisting of the first-level division targets are fitted to one or more cubes. Here, the cube represents the position of the vehicle.

In this way, as illustrated in FIG. 8B, the CSP based on the geometric model is constructed by integrating these structure maps in the order from low to high. It should be noted that, the step of forming the pyramid is an optional step.

In step 404 of FIG. 4, high level CSP analysis is performed to obtain the detection target.

Figure 9:
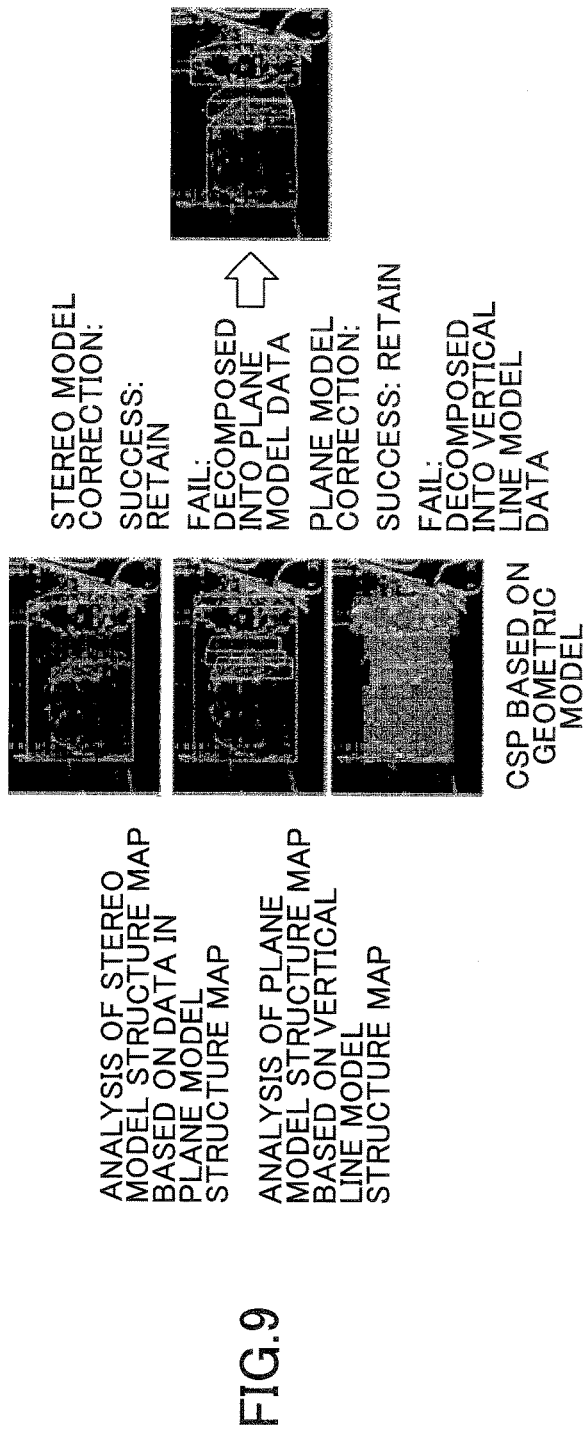
FIG. 9 is a schematic drawing illustrating a structure map of a high level target analysis result including the target generated by integrating the series of high level structure maps illustrated in FIG. 8A.

In this step, as illustrated in FIG. 9, the geometric model in the high level structure map of the CSP is decomposed, and summarization of the geometric models of low level structure map of the CSP is performed to obtain the detection target. FIG. 9 is a schematic drawing illustrating a structure map of a high level target analysis result including the target generated by integrating the series of high level structure maps illustrated in FIG. 8A.

Specifically, as an example, analysis for cube model data in the top layer structure map (the lower-left image) is performed, based on the plane model data in the intermediate layer structure map (the middle-left image). As can be seen, there are several planes in the cube and the distribution of these planes does not satisfy the cube model, thus the cube is decomposed into planes. The verification of the plane model data is performed, based on the vertical model data in the bottom layer structure map (the upper-left image). The planes do not satisfy the data distribution of the plane model since the frontmost plane covers other planes (the vehicle on the left and the motorcycle on the right have similar disparity values, namely distance values or depth values, and constitute the frontmost plane, but there is a plane consisting of other objects therein); thus the frontmost plane is decomposed into vertical line model data. On the other hand, verification for other planes is performed based on the vertical line model data, and these planes may be retained since the distribution of these planes satisfies the plane mode distribution. In this way, the model is decomposed from top to bottom, and the summarization of the model is performed from bottom to top. The vertical line model data decomposed from the cube model and the plane model may be fitted to new planes; as illustrated in the right image of FIG. 9, these planes may be further fitted so that more accurate cubes can be formed by combining these planes and the planes retained before. These cubes may be input as a high level result whose the target position is more accurate. In this way, mutual correction between high level structure maps of each of the layers is performed.

It should be noted that, the above method is just an example, and the correction method may be designed based on the high level structure maps of each of the layers and the features of the object to be detected.

The description of the specific example of FIGS. 6 to 9 is just an example, the pyramids may be constructed based on different features, rules or models, the pyramids of each of the layers and levels may also be designed to perform analysis and detection at individual accurate level for the object to be detected, and the description thereof is omitted here.

Figure 10:
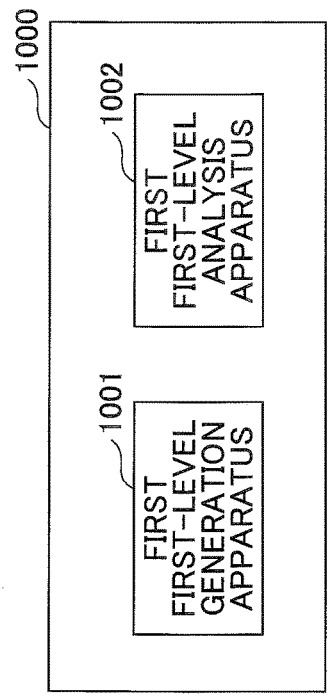
FIG. 10 is a block diagram illustrating a system for analyzing a target in a stereo image by displaying the stereo image using a cascade structure according to an embodiment of the present invention.

FIG. 10 is a block diagram illustrating a system for analyzing a target in a stereo image by displaying the stereo image using a cascade structure according to an embodiment of the present invention.

As illustrated in FIG. 10, the system 1000 for analyzing a target in a stereo image by displaying the stereo image using a cascade structure includes: a first first-level generation apparatus 1001 configured to, for the input stereo image, generate, based on a first relevant feature, rule or model of the stereo image, at least a first first-level structure map, each of the first first-level structure maps being generated based on an individual tolerance level of the first relevant feature, rule or model, and each of the first first-level structure maps including the target at an individual first division level; and a first first-level analysis apparatus 1002 configured to at least partly integrate the first first-level structure maps and analyze the target in the stereo image, to obtain a structure map of a first-level target analysis result including the target.

In this way, mutual correction of division structure maps including the target at the individual division level obtained by the relevant feature, rule or model, such as a structure map with an over-divided region, a structure map with an over-merged region or a structure map with an appropriate size region, is performed; and it is determined which one of the targets obtained by dividing at the first division levels, respectively, is more accurate based on a feature of the target. Thus, a more accurate division target can be obtained.

In an embodiment, the system 1000 may further include: a second first-level generation apparatus (not shown) configured to generate, for the input stereo image, based on a second relevant feature, rule or model that is different from the first relevant feature, rule or model, at least a second first-level structure maps, each of the second first-level structure map being generated based on an individual tolerance level of the second relevant feature, rule or model, and each of the second first-level structure maps including the target at an individual second division level; and a second first-level analysis apparatus (not shown) configured to at least partly integrate the first first-level structure maps and the second first-level structure maps and analyze the target in the stereo image, to obtain a structure map of a first-level target analysis result including the target.

The system 1000 may further include: a second-level generation apparatus configured to generate, for the structure map of the first-level target analysis result, based on a third relevant feature, rule or model that is different from the first and second relevant features, rules or models, at least a second-level structure map, each of the second-level structure maps being generated based on an individual tolerance level of the third relevant feature, rule or model, and each of the second-level structure maps including the target at an individual third fitting level; and a second-level analysis apparatus configured to at least partly integrate the second-level structure maps and analyze the target in the stereo image, to obtain a structure map of a second-level target analysis result including the target.

In an embodiment, the first or second relevant feature, rule or model may include a space adjacency feature, a grayscale conformity feature, an edge continuity feature, or a contour feature that are used for clustering. The individual tolerance level of the first or second relevant feature, rule or model may include clustering based on an individual space disparity (namely, distance) threshold using a fixed disparity center or a movable disparity center in a case of the space adjacency feature, include clustering based on an individual grayscale difference threshold in a case of the grayscale consistency feature, include clustering based on an individual edge continuity threshold in a case of the edge continuity feature, or include clustering based on an individual contour inclusion relation in a case of the contour feature. The third relevant feature, rule or model may include a vertical line fitting model, a plane fitting model or a cube fitting model.

In an embodiment, the first first-level analysis apparatus may perform mutual correction of the first first-level structure maps including the target at the individual first division level and determine which one of the targets obtained by dividing at the first division levels, respectively, is more accurate based on a feature of the target, to obtain the structure map of the first-level target analysis result that includes the target obtained by dividing at the determined first division level.

In an embodiment, the second first-level analysis apparatus may correct the first first-level structure maps based on the second first-level structure maps and determine which one of the targets obtained by dividing at the first and second division levels, respectively, is more accurate based on a feature of the target, to obtain the structure map of the first-level target analysis result that includes the target obtained by dividing at the determined division level.

The first first-level analysis apparatus may perform mutual correction of the second-level structure maps including the target at the individual third fitting level and determine which of the targets obtained by dividing at the third fitting levels, respectively, is more accurate based on a feature of the target, to obtain the structure map of the second-level target analysis result that includes the target obtained by dividing at the determined third fitting level.

The second first-level analysis apparatus may perform merging or division for the targets obtained by dividing in the first or second first-level structure map to attain the target obtained by dividing at the determined division level, after determining which of the targets obtained by dividing at the first and second division levels, respectively, is more accurate based on the feature of the target.

The second-level analysis apparatus may perform merging or division for the targets obtained by dividing in the second-level structure maps to attain the target obtained by dividing at the determined division level, after determining which of the targets obtained by dividing at the third fitting levels, respectively, is more accurate based on the feature of the target.

In an embodiment, the feature of the target may include symmetry of the target, horizontal grayscale conformity of the target, or an inclusion characteristic of the inner contour of the target.

In this way, in a two-level pyramid structure, a further target analysis can be performed based on a preliminary target analysis result of the first-level pyramid structure, thus a more accurate result of the target analysis can be obtained.

It should be noted that, the advantage or effect of the present invention is described above. The above descriptions of the embodiments are just examples, and various modifications, replacements or combinations may be made without departing from the scope of the present invention by persons skilled in the art.

The block diagrams of the units, apparatuses, devices and system are just examples, the connection, placement and configuration illustrated in the block diagrams related to the present invention are not limited to these examples, and the units, apparatuses, devices and system may be connected, placed or configured in any way. The terms "comprise", "include" and "have" are open-form terms, which mean and may be changed into "include and is not limited to". The terms "or" and "and" mean and may be changed into "and/or", unless the context is clearly not. The term "such as" means and may be changed to "such as, but not limited to".

The flowchart and the method according to the present invention are just examples, and not limited to the steps in the embodiments. The steps of the embodiments may be performed in any order. The terms "next", "subsequently" and "then" are just for describing the present invention, and the present invention is not limited to these terms. Furthermore, the articles "a", "an" and "the" should not be limited to the singular element.

The steps or apparatuses of the present invention are described above. The above descriptions of the embodiments are just examples, and various modifications, replacements or combinations may be made without departing from the scope of the present invention by persons skilled in the art.

The steps of the above method may be performed by any appropriate means that can perform the corresponding functions. The means may include any components and/or modules of hardware and/or software, and include but not be limited to a circuit, a dedicated application-specific integrated circuit (ASIC) or a processor.

The present invention may use a general-purpose processor, a digital signal processor (DSP), an ASIC, a field programmable gate array (FPGA) or other programmable logic device (PLD), a discrete gate or transistor logic, discrete hardware components or any other combination for executing the functions to realize the logic blocks, modules and circuits of the embodiments. The general-purpose processor is a micro-processor, and alternatively, the processor may be any processors, controllers, micro-controllers or state machines that can be obtained commercially. The processor may also be the combination of the computer equipment, such as the combination of a DSP and a micro-processor, the combination of plural micro-processors, or the combination of a DSP and plural micro-processors.

The steps of the method according to the present invention may be incorporated in the hardware, software modules executed by a processor or the combination of these two directly. The software modules may be stored in a recording medium with any shape. The examples of the recording medium includes a random access memory (RAM), a read-only memory (ROM), a flash memory, an EPROM memory, an EEPROM memory, a register, a hard disk drive, a removable disk, a CD-ROM, etc. The recording medium may be linked to a processor so that the processor reads information from the recording medium or writes information into the recording medium. Alternatively, the recording medium and the processor may also be a whole apparatus. The software module may be a single command or many commands, and may be distributed in several code segments, different programs or plural recording media.

Steps of the above method may be performed in time order, however the performing sequence is not limited to the time order. Any steps may be performed in parallel or independently.

The functions may be realized by hardware, software, firmware or any combination thereof. When the function is implemented by software, the function may be stored in a computer-readable medium as one or more commands. The recording medium may be any real medium that can be accessed by a computer. Such a computer-readable medium includes a RAM, a ROM, an EEPROM, a CD-ROM or other laser discs, a magnetic disk or other magnetic memory, or any other real media that carry or store commands, data or program codes and are accessed by the computer. Such disk and disc include a CD, a laser disc, an optical disc, a DVD disc, a floppy disk and a blue-ray disc, and the disk usually reproduces data and the disc reproduces data by a laser.

Thus, the operations may be performed by a computer program product. For example, such computer program product may be a tangible medium where computer-readable commands are stored (or coded), and the commands may be executed by one or more processors to perform the operation. The computer program product may include packaging material.

The software or commands may also be transmitted by a transmission medium. For example, an axial cable, an optical cable, a twisted cable, a digital subscriber line (DSL), or a transmission medium of the wireless technology of infra-red, wireless or microwave may be used to transmit the software from a website, a server or other remote source.

Additionally, the modules and/or other appropriate means of the method or technology may be obtained from a user terminal and/or base station, or by other methods. For example, such equipment may be connected to a server so as to perform the transmission of the means of the above method. Alternatively, the methods may be provided via a storage unit (for example, a physical storage medium such as a RAM, a ROM, a CD or a floppy disc), so that the user terminal and/or the base station can obtain the methods when it is connected to the equipment. Furthermore, any other appropriate technology may be provided to the equipment by the method.

The present specification and the appended claims includes other examples and implementations. For example, the above functions may be implemented by a processor, hardware, software, firmware, hard-wire or any combination thereof. The features for implementing the functions may be located at any physical position where which is distributed to each position physically. Furthermore, the term "or" before the term "at least one" means a separate enumerating, and for example, "at least one of A, B or C" means (1) A, B or C, (2) AB, AC or BC, or (3) ABC (namely, A and B and C). Additionally, the term "example" does not mean a preferable example or an example superior to other examples.

Various modifications, replacements or combinations may be made without departing from the scope of the present invention by persons skilled in the art. Furthermore, the scope of the present specification and the claims are not limited to the above processing, machine, manufacture, composition of events, means, method and operation. The processing, machine, manufacture, composition of events, means, method and operation with a similar function or a similar result may also be applied to the present invention. Therefore, the scope of the appended claims include such processing, machine, manufacture, composition of events, means, method and operation.

The purposes of the present invention is described above. The above descriptions of the embodiments are just examples, and various modifications, replacements or combinations may be made without departing from the scope of the present invention by persons skilled in the art.

The basic principle of the present invention is described above with reference to the embodiments, however the present invention is not limited to the principle.

The present application is based on and claims the benefit of priority of Chinese Priority Application No. 201410264246.X filed on Jun. 13, 2014, the entire contents of which are hereby incorporated by reference.

What is claimed is:

1. A method for analyzing a target in a stereo image by displaying the stereo image using a cascade structure, the method comprising:
generating a plurality of first-level structure maps based on the stereo image, each first-level structure map being based on an individual tolerance level of a first relevant feature, rule or model of the stereo image, each first-level structure map of the plurality of first-level structure maps including a representation of the target divided according to an individual first division level such that the first-level structure maps include separate, respective first representations of the target divided according to separate, respective first division levels; and at least partly integrating the plurality of first-level structure maps to generate a structure map of a first-level target analysis result including a representation of the target, wherein the at least partly integrating includes performing mutual correction of the plurality of first-level structure maps to determine a division level, of the first division levels, that is associated with a representation of the target, of the representations of the target, having a greatest level of accuracy based on a feature of the target, to generate a structure map of the first-level target analysis result that includes a representation of the target divided according to the determined first division level.

2. The method for analyzing a target according to claim 1, the method comprising:
generating at least one second first-level structure map based on the stereo image, each second first-level structure map being based on an individual tolerance level of a second relevant feature, rule or model that is different from the first relevant feature, rule or model, each second first-level structure map including a representation of the target divided according to an individual second division level; and
at least partly integrating the plurality of first-level structure maps and the at least one second first-level structure map to generate a structure map of a first-level target analysis result including a representation of the target.

3. The method for analyzing a target according to claim 2, the method comprising:
generating at least one second-level structure map based on the structure map of the first-level target analysis result, each second-level structure map being based on an individual tolerance level of a third relevant feature, rule or model that is different from the first and second relevant features, rules or models, each second-level structure map including a representation of the target divided according to an individual third fitting level; and
at least partly integrating the at least one second-level structure map to generate a structure map of a second-level target analysis result including a representation of the target.

4. The method for analyzing a target according to claim 3, wherein,
at least one of the first relevant feature, rule or model and the second relevant feature, rule or model includes a space adjacency feature, a grayscale conformity feature, an edge continuity feature, or a contour feature associated with clustering,
the individual tolerance level of the first relevant feature, rule or model or the individual tolerance level of the second relevant feature, rule or model includes one of,
clustering based on an individual space disparity threshold using a fixed disparity center or a movable disparity center in a case of the space adjacency feature,
clustering based on an individual grayscale difference threshold in a case of a grayscale consistency feature,
clustering based on an individual edge continuity threshold in a case of the edge continuity feature, or
clustering based on an individual contour inclusion relation in a case of the contour feature, and
the third relevant feature, rule or model includes a vertical line fitting model, a plane fitting model or a cube fitting model.

5. The method for analyzing a target according to claim 3, wherein,
at least partly integrating the at least one second-level structure map to generate the structure map of the second-level target analysis result including the representation of the target includes,
performing mutual correction of the at least one second-level structure map to determine a third fitting level, of at least one third fitting level, that is associated with a representation of the target, of the representations of the target, having a greatest level of accuracy based on a feature of the target, to generate a structure map of the second-level target analysis result that includes a representation of the target divided according to the determined third fitting level.

6. The method for analyzing a target according to claim 5, wherein,
performing mutual correction of the at least one second-level structure map including the representation of the target divided according to the individual third fitting level includes,
after determining the third fitting level that is associated with a representation of the target having a greatest level of accuracy, performing merging or division for the representations of the targets divided according to the at least one third fitting level to generate the representation of the target divided according to the determined third fitting level.

7. The method for analyzing a target according to claim 2, wherein,
at least partly integrating the plurality of first-level structure maps and the at least one second first-level structure map to generate the structure map of the first-level target analysis result including the representation of the target includes,
correcting the plurality of first-level structure maps based on the at least one second first-level structure map to determine a division level, of the first division levels and at least one second division level, that is associated with a representation of the target, of the first representations of the target and at least one second representation of the target, having a greatest level of accuracy based on a feature of the target, to generate a structure map of the first-level target analysis result that includes a representation of the target divided according to the determined division level.

8. The method for analyzing a target according to claim 7, wherein,
correcting the plurality of first-level structure maps based on the at least one second first-level structure map includes,
after determining the division level that is associated with a representation of the target having a greatest level of accuracy, performing merging or division for the representations of the target divided according to the first division levels or the at least one second division level, to generate the representation of the target divided according to the determined division level.

9. The method for analyzing a target according to claim 1, wherein,
performing mutual correction of the plurality of first-level structure maps including the target at the individual first division level includes, after determining the division level that is associated with a representation of the target having a greatest level of accuracy, performing merging or division for the representations of the target divided according to the first division levels to generate the representation of the target divided according to the determined division level.

10. The method for analyzing a target according to claim 1, wherein,
the feature of the target includes one of,
a symmetry of the target,
a horizontal grayscale conformity of the target, or
an inclusion characteristic of an inner contour of the target.

11. The system of claim 10, the processor further configured to execute the program of instructions to,
generate at least one second first-level structure map based on the stereo image, each second first-level structure map being based on an individual tolerance level of a second relevant feature, rule or model that is different from the first relevant feature, rule or model, each second first-level structure map including a representation of the target divided according to an individual second division level; and
at least partly integrate the plurality of first-level structure maps and the at least one second first-level structure map to generate a structure map of a first-level target analysis result including a representation of the target.

12. The system of claim 11, wherein,
at least partly integrating the plurality of first-level structure maps and the at least one second first-level structure map to generate the structure map of the first-level target analysis result including the representation of the target includes,
correcting the plurality of first-level structure maps based on the at least one second first-level structure map to determine a division level, of the first division levels and at least one second division level, that is associated with a representation of the target, of the first representations of the target and at least one second representation of the target, having a greatest level of accuracy based on a feature of the target, to generate a structure map of the first-level target analysis result that includes a representation of the target divided according to the determined division level.

13. The system of claim 11, the processor further configured to execute the program of instructions to,
generate at least one second-level structure map based on the structure map of the first-level target analysis result, each second-level structure map being based on an individual tolerance level of a third relevant feature, rule or model that is different from the first and second relevant features, rules or models, each second-level structure map including a representation of the target divided according to an individual third fitting level; and
at least partly integrate the at least one second-level structure map to generate a structure map of a second-level target analysis result including a representation of the target.

14. The system of claim 13, wherein,
at least partly integrating the at least one second-level structure map to generate the structure map of the second-level target analysis result including the representation of the target includes,
performing mutual correction of the at least one second-level structure map to determine a third fitting level, of at least one third fitting level, that is associated with a representation of the target, of the representations of the target, having a greatest level of accuracy based on a feature of the target, to generate a structure map of the second-level target analysis result that includes a representation of the target divided according to the determined third fitting level.

15. A system for analyzing a target in a stereo image by displaying the stereo image using a cascade structure, the system comprising:
a memory storing a program of instructions; and
a processor configured to execute the program of instructions to,
generate a plurality of first-level structure maps based on the stereo image, each first-level structure map being based on an individual tolerance level of a first relevant feature, rule or model of the stereo image, each first-level structure map of the plurality of first-level structure maps including the target at an individual first division level; and
at least partly integrate the plurality of first-level structure maps to generate a structure map of a first-level target analysis result including a representation of the target, the at least partly integrating including performing mutual correction of the plurality of first-level structure maps to determine a division level, of the first division levels, that is associated with a representation of the target, of the representations of the target, having a greatest level of accuracy based on a feature of the target, to generate a structure map of the first-level target analysis result that includes a representation of the target divided according to the determined first division level.

16. A method, comprising:
generating a plurality of first structure maps based on a stereo image, the stereo image including a target, each first structure map being based on an individual tolerance level of a relevant feature, rule or model of the stereo image, each first structure map including a first representation of the target divided according to an individual first division level, such that the first structure maps include separate, respective first representations of the target divided according to separate, respective first division levels;
performing mutual correction of the plurality of first structure maps to determine a division level, of the first division levels, that is associated with a representation of the target, of the first representations of the target, having a greatest level of accuracy based on a feature of the target; and
generating a structure map that includes a representation of the target divided according to the determined division level.

17. The method of claim 16, further comprising:
generating at least one second structure map based on the stereo image, each second first-level structure map being based on an individual tolerance level of a second relevant feature, rule or model that is different from the relevant feature, rule or model, each second structure map including a second representation of the target divided according to an individual second division level; and
correcting the plurality of first structure maps based on the at least one second structure map to determine a division level, of the first division levels and at least one second division level, that is associated with a representation of the target, of the first representations of the target and at least one second representation of the target, having a greatest level of accuracy based on the feature of the target.

18. The method of claim 16, further comprising:

performing merging or division of the first representations of the target to generate the representation of the target divided according to the determined division level.

* * * * *